(12) United States Patent  
Nagaoka

(10) Patent No.: US 6,707,451 B1
(45) Date of Patent: Mar. 16, 2004

(54) INPUT PEN

(75) Inventor: Toshimasa Nagaoka, Odawara (JP)

(73) Assignee: Pilot Precision Kabushiki Kaisha, Kanagawa-ken (JP)

( * ) Notice: Subject to any disclaimer, the term of this patent is extended or adjusted under 35 U.S.C. 154(b) by 1072 days.

(21) Appl. No.: 08/924,681

(22) Filed: Sep. 5, 1997

(30) Foreign Application Priority Data

| Sep. 11, 1996 | (JP) | 8-262509 |
| Feb. 7, 1997 | (JP) | 9-039918 |
| Feb. 12, 1997 | (JP) | 9-043032 |
| Mar. 13, 1997 | (JP) | 9-078833 |
| Mar. 21, 1997 | (JP) | 9-087469 |
| Mar. 31, 1997 | (JP) | 9-096631 |
| May 27, 1997 | (JP) | 9-152897 |

(51) Int. Cl.$^7$ ................................. G09G 5/00
(52) U.S. Cl. ............... 345/179; 345/173; 178/19.01; 178/19.03
(58) Field of Search ............... 345/173–179; 178/18.01, 18.03, 18.05, 19.01, 19.02, 19.03, 19.04, 19.05

(56) References Cited

U.S. PATENT DOCUMENTS

| 5,475,401 A | * 12/1995 | Verrier et al. ............... 345/179 |
| 5,571,997 A | * 11/1996 | Gray et al. .................. 345/179 |
| 5,581,052 A | * 12/1996 | Padula et al. ............... 345/179 |
| 5,638,093 A | * 6/1997 | Takahashi et al. ........... 345/173 |
| 5,654,529 A | * 8/1997 | Yeung et al. ................. 178/18 |
| 5,756,941 A | * 5/1998 | Snell ........................... 345/179 |
| 5,850,059 A | * 12/1998 | Yoshimura ................... 345/179 |

* cited by examiner

Primary Examiner—Richard Hjerpe
Assistant Examiner—Kimnhung Nguyen
(74) Attorney, Agent, or Firm—Ladas & Parry

(57) ABSTRACT

A pen cylinder has at its front end a front input member made of a synthetic resin and at its rear end a rear input member made of a soft elastic material such as rubber. When performing an input operation onto a hard panel or an input operation of fine letters, an accurate input is achieved by using the front input member of synthetic resin provided on the front end of the pen cylinder. When performing input onto a soft panel or pointing input, an input free from damage to the panel is achieved by using the rear input member composed of soft elastic material.

21 Claims, 8 Drawing Sheets

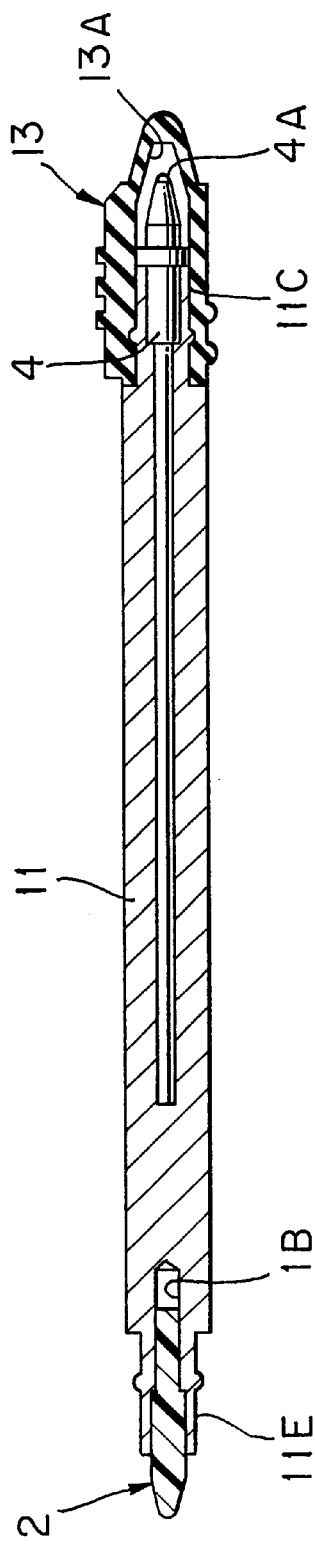
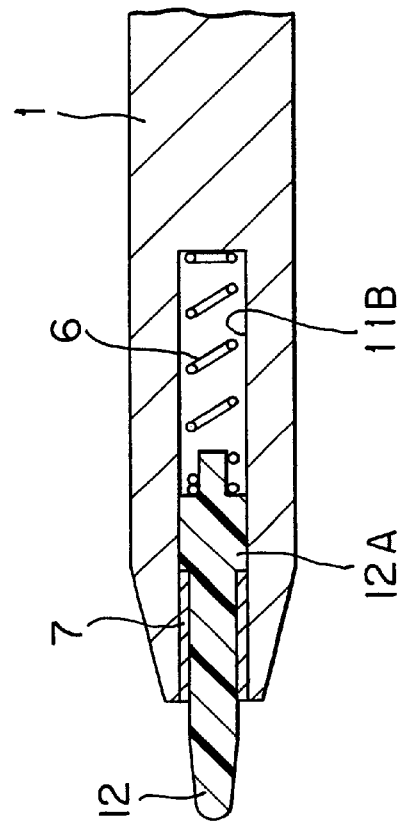
FIG. 3
FIG. 4

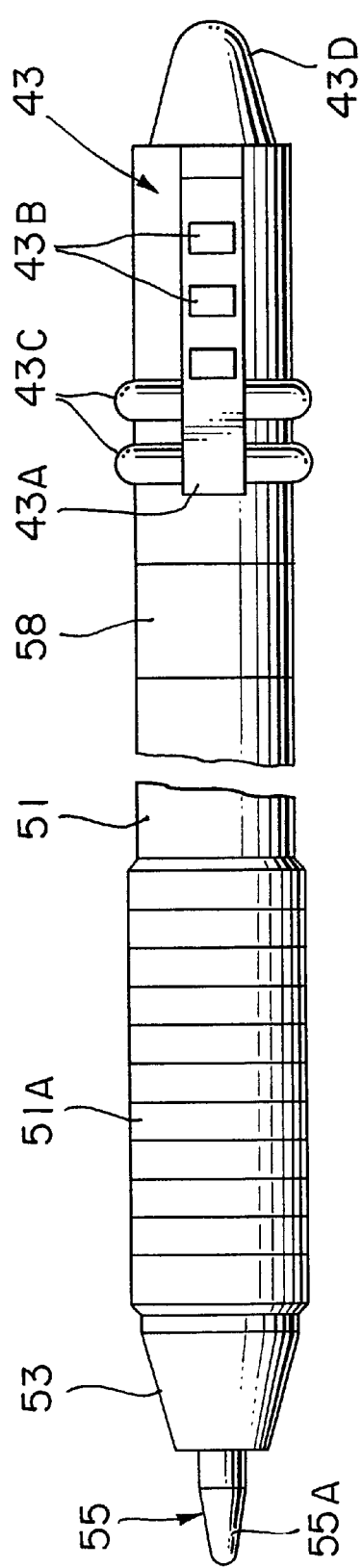
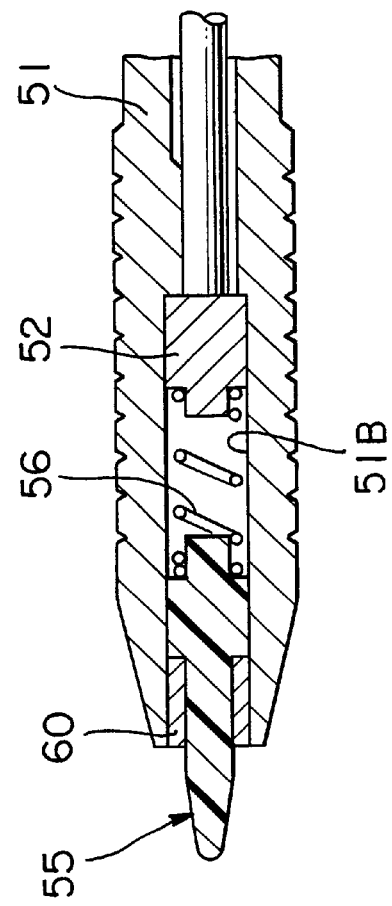
FIG. 13
FIG. 14

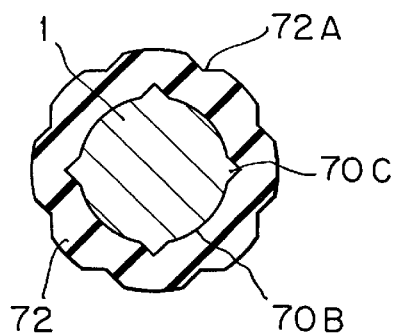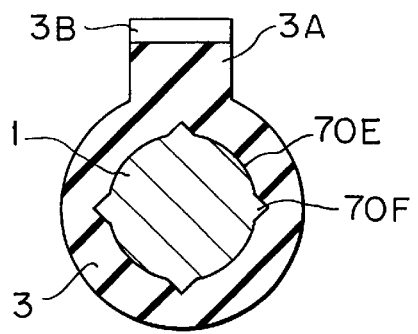
FIG. 17        FIG. 18
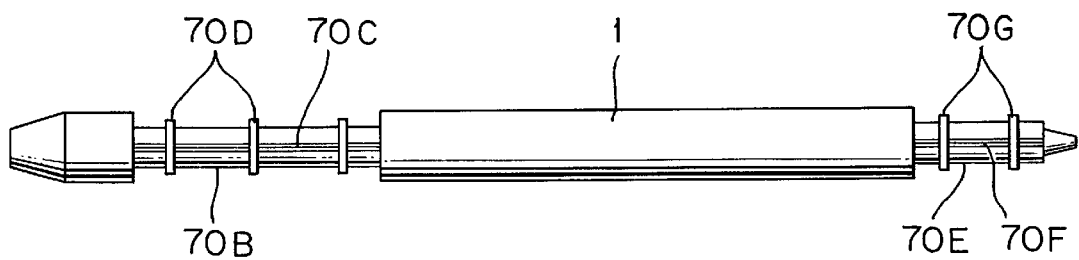
FIG. 19

INPUT PEN

BACKGROUND OF THE INVENTION

1. Field of the Invention

The present invention relates to an input pen for use in a pressure sensitive handwriting input unit.

2. Description of the Related Art

Heretofore, in the case of performing an input operation onto a hard panel or an input operation of fine letters, an input pen was used which is made of a synthetic resin and has a tip with a small radius of curvature, whereas in the case of performing an input operation onto a soft panel or a pointing input operation use was made of an input pen made of a soft elastic material and having a tip with a large radius of curvature. Accordingly, in the prior art, two different types of input pens had to be provided and used depending on the situations of use, which was extremely troublesome.

SUMMARY OF THE INVENTION

It is therefore the object of the present invention to provide an input pen capable of solving the above problems.

According to the present invention, in order to achieve the above object, there is provided an input pen for use in a pressure sensitive handwriting input unit, the input pen comprising a pen cylinder having at its front end a front input member made of a synthetic resin and having at its rear end a rear input member made of a soft elastic material such as a rubber.

By providing both ends of the pen cylinder with the input members having different hardnesses and by inverting the input pen in use if necessary, input operations depending on the usage and situations are ensured with a single input pen.

An input tip for a front input member of the inventive input pen may be formed from a curved surface having a radius of curvature ranging from 0.5 mm to 1 mm inclusive.

An input tip for a rear input member of the input pen of the invention may be formed of a curved surface having a radius of curvature ranging from 1.5 mm to 4 mm inclusive. In this manner, the tip of the rear input member has a larger radius of curvature than the tip of the front input member.

The soft elastic material constituting the rear input member may be a rubber such as fluorinated rubber. Preferably, the rear input member is preferably subjected to a chemical reaction with a surface treatment agent to reduce its friction coefficient, thereby ensuring a smooth writing onto the panel. The rear input member may be comprised of a thermoplastic elastomer.

The rear input member may in the form of a cap adapted to be fitted onto the exterior of the rear end of the pen cylinder. The cap-like rear input member may be provided with an exterior with a protrusion which, when inserted into an input pen accommodating portion of a pressure sensitive handwriting input unit, comes into frictional contact with the input pen accommodating portion. Such an protrusion may be a circumferential protrusion. At a position corresponding to that protrusion, a recess may be formed on the outer peripheral surface of the rear part of the pen cylinder. This arrangement will facilitate elastic deformation of the protrusion toward the recess upon the insertion into the input pen accommodating portion.

A writing end of a writing implement such as a ball-point pen may be provided so as to project from the rear end of the pen cylinder which is covered by the cap-like rear input member. Thus, by removing the rear input member of the input pen, ordinary writing can be carried out.

The pen cylinder may have a first annular recess posterior to the front input member and a second annular recess at the position of the rear input member so that a cylindrical holder and the rear input member are simultaneously insert-molded into the first and second annular recesses, respectively, the cylindrical holder and the rear input member being made of the same soft elastic material.

BRIEF DESCRIPTION OF THE DRAWINGS

FIG. 3 is a longitudinal sectional view of another embodiment of the input pen in accordance with the present invention;

FIG. 4 is a sectional view showing a variant of a front input member and its vicinity of the input pen in accordance with the present invention;

FIG. 13 is a plan view of FIG. 12;

FIG. 14 is a sectional view showing a variant of the front part of the input pen of FIG. 12;

FIG. 17 is a cross section taken along the line XVII—XVII of FIG. 16;

FIG. 18 is a cross-sectional view taken along the line XVIII—XVIII of FIG. 16; and FIG. 19 is an explanatory diagram of a process for manufacturing the embodiment of FIG. 15.

DESCRIPTION OF THE PREFERRED EMBODIMENTS

Figure 1:
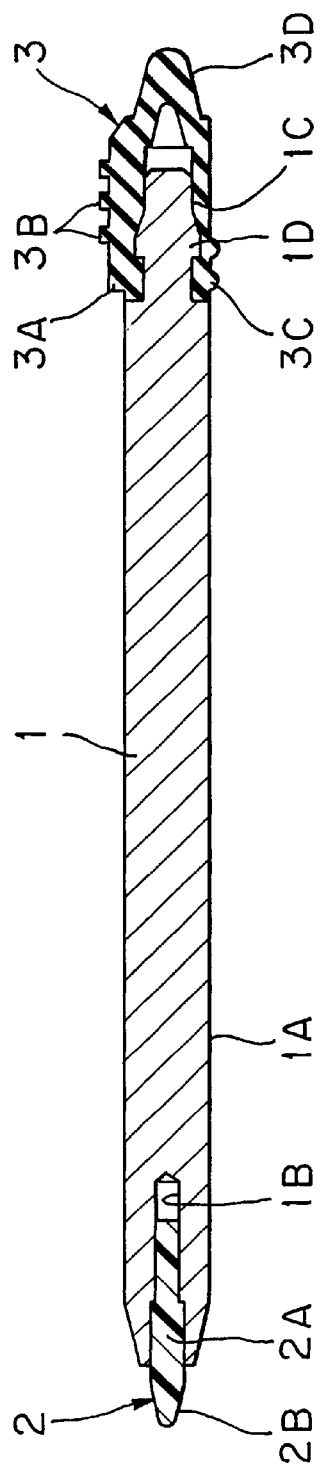
FIG. 1 is a longitudinal sectional view of an embodiment of an input pen in accordance with the present invention.
Figure 2:
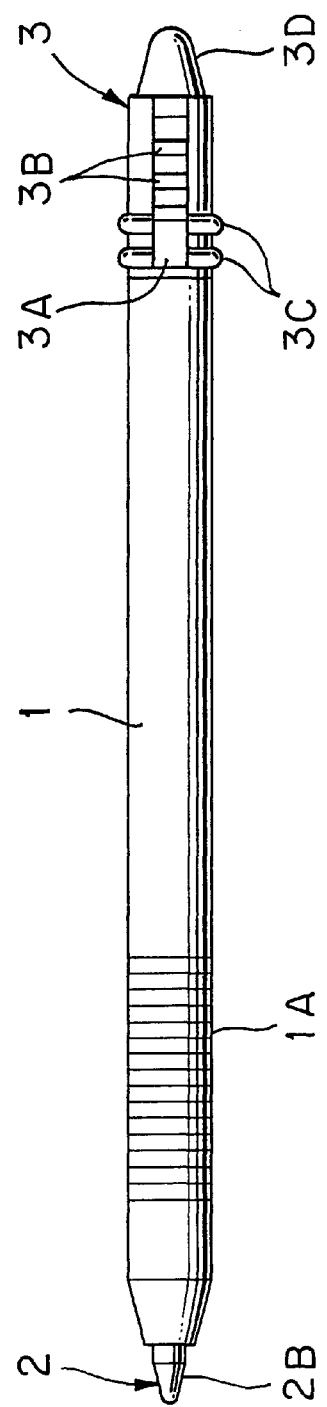
FIG. 2 is a plan view of FIG. 1.

An input pen of the present invention will now be described with reference to the accompanying drawings. FIGS. 1 and 2 illustrates an embodiment of the input pen in accordance with the present invention. In these figures, the left-hand and right-hand sides are referred to respectively as front and rear sides. A pen cylinder 1 is made of a synthetic resin or a metal and comprises a grip 1A provided with slip resistant grooves. The pen cylinder 1 further comprises at its front end an axial hole 1B into which is fixedly press fitted a rear part 2A of a front input member 2. The front input member 2 is made of a synthetic resin such as polyacetal, polyethylene and nylon and includes at its extremity an input portion 2B in the form of a substantially conical shape with a tip which is formed from a curved surface having a radius of curvature ranging from 0.5 mm to 1 mm inclusive. Preferably, the tip of the front input member 2 is formed from a curved surface having a radius of curvature of the order of 0.8 mm.

The pen cylinder 1 comprises at its rear end a reduced diameter portion 1C having a protuberance 1D formed on the surface thereof. The protuberance 1D is tapered to be reduced in cross section toward the rearmost end. Onto the reduced diameter portion 1C of the pen cylinder 1 is fixedly press fitted a rear input member 3 made of a soft elastic material such as rubber. The rear input member 3 includes a longitudinal raised portion 3A for facilitating removal from the body of a pressure sensitive handwriting input unit, slip resistant protrusions 3B formed on the external surface of the raised portion 3A across the latter, and a protrusion 3C to be used for the fitting into the body of the input unit. The protrusion 3C extends substantially annularly around the rear input member 3. The rear input member 3 further includes at its tip an input portion 3D of substantially conical shape with a tip which is formed from a curved surface having a radius of curvature ranging from 1.5 mm to 4 mm inclusive. Preferably, the tip of the rear input member is formed from a curved surface having a radius of curvature of the order of 2 mm.

The rear input member 3 may be attached to the pen cylinder 1 by adhesion or insert-molding. The longitudinally extending raised portion 3A serves to prevent unintentional rolling of the input pen. The circumferentially extending protrusion 3C comes into a frictional contact with the inner surface of an input pen accommodating portion formed in the input unit body, to ensure a secure accommodation of the input pen.

When dismounting the input pen accommodated within the input unit body, user's fingers are used to act on the raised portion 3A of the rear input member 3 projecting from the accommodating portion, enabling the input pen to be easily released therefrom. The slip resistant protrusions 3B formed on the raised portion 3A will also contribute to a secure operation free from slip of the fingers. The input portion 3D is used to input to a panel. The rear input member 3 can be molded integrally with the input portion 3D, the raised portion 3A for preventing the input pen from unintentionally rolling, and the protrusion 3C coming into frictional contact with the inner surface of the input pen accommodating portion of the input unit body.

In use of the input pen of the above-described first embodiment, the front input member 2 is usable when performing an input operation onto a hard panel or an input operation of fine letters, while the rear input member 3 is usable in the case of input onto a soft panel or of pointing input, thus eliminating the necessity of providing two different types of input pens, which is a very convenient feature for the user.

FIG. 3 illustrates another embodiment of the input pen in accordance with the present invention. A pen cylinder 11 contains a ballpoint pen refill 4 removably fitted in the rear end thereof. The refill 4 has a writing end 4A. A rear input member 13 is removably fitted onto a reduced diameter portion 11C of the pen cylinder 11 and serves as a cap for the ballpoint pen refill 4. The rear input member 13 includes a hollow portion 13A adapted to be fitted onto a front reduced diameter portion 11E of the pen cylinder 11. The materials and shapes of the tips of the front 2 and rear 13 input members are substantially the same as those of the above embodiment. As an alternative to this embodiment, the ballpoint pen refill 4 may be replaced by another form of writing means such as a mechanical pencil, a fibrous pen, etc.

According to the embodiment described above, when performing an input operation on a hard panel or an input operation of fine letters, use is made of the front input member of synthetic resin provided on the front end of the pen cylinder, to thereby ensure an accurate pen input. On the contrary, in the case of the input on a soft panel or of a pointing input, use is made of the rear input member made of soft elastic material, thereby making it possible to perform an input without providing any damage to the panel. Additionally, two different types of input operations are achieved by merely inverting the input pen, which is a very convenient feature for the user.

Since the above-described rear input member is made of a soft elastic material such as rubber, its large friction coefficient will impede a smooth sliding action of the input member on the panel in the case of a writing sense of input in which the input member is required to smoothly slide on the panel, although there is no problem for the pointing input, thus damaging the panel and making it difficult to perform the input operation.

However, the friction coefficient of the rear input member can be reduced by subjecting its surface to a surface treatment agent for chemical reaction. More specifically, the input member is comprised of diene-series rubber such as natural rubber, synthetic natural rubber, styrene-butadiene rubber, butadiene rubber and nitrile rubber, and its surface is so treated that the double bond within the rubber chemically reacts with the surface treatment agent, thereby reducing its friction coefficient.

A method of manufacturing the rear input member includes a method in which the diene-rubber input member is immersed in a solution of a surface treatment agent to cause the double bond within the rubber to chemically react with the surface treatment, agent to thereby reduce the friction coefficient of the surface of the input member, and a method in which a surface treatment agent is applied to a surface of the diene-rubber input member to cause the double bond within the rubber to chemically react with the surface treatment agent, thereby reducing the friction coefficient of the surface of the input member.

The chemical reaction type surface treatment agent is preferably Athlete (trade name; manufactured by Zeone Kasei) from its advantages including short treatment time, lesser treatment unevenness, and no or little damage to the rubber itself. Athlete is a chemical surface treatment agent which brings the organic active halogeide into contact with the vulcanized surface of the rubber sulfide, to thereby reduce the friction coefficient of the vulcanized rubber surface.

The above deficiency of the rear input member having a large friction coefficient and therefore hard to use for a writing sense of input sliding on the panel can be solved by forming the rear input member from the fluorinated rubber. The fluorinated rubber has an elasticity as well as a smaller friction coefficient, and hence the input member made of the same can slide smoothly on the panel and enables the writing sense of input operation to be pleasantly performed without providing any damage to the panel.

Although in the above embodiment the rear part 2A of the front input member 2 is fixedly press fitted into the hole 1B of the pen cylinder 1, the arrangement may be such that as shown in FIG. 4 the front input member 12 is slidably received in a hole 11B of the pen cylinder 1 and is forwardly urged by a spring 6 disposed between the rear part 12A of the input member 12 and the bottom surface of the hole 11B, the front input member 12 being brought into abutment against a tubular stopper 7 secured to the hole 11B of the pen cylinder 1. In this case, when the front input member 12 is pressed against the panel with an excess force, the front input member 12 is retreated while compressing the spring 6, to,thereby prevent the panel from being damaged.

Figure 5:
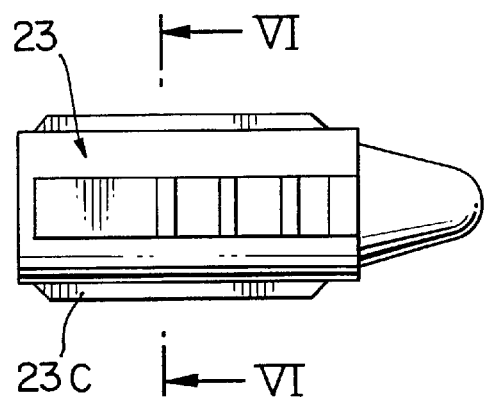
FIG. 5 is a plan view of a rear input member of the input pen in accordance with the present invention.
Figure 6:
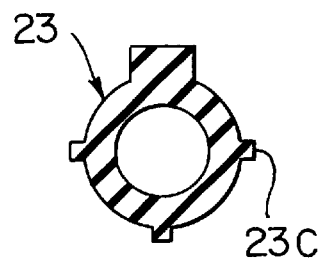
FIG. 6 is a cross section taken along a line VI—VI of FIG. 5.
Figure 7:
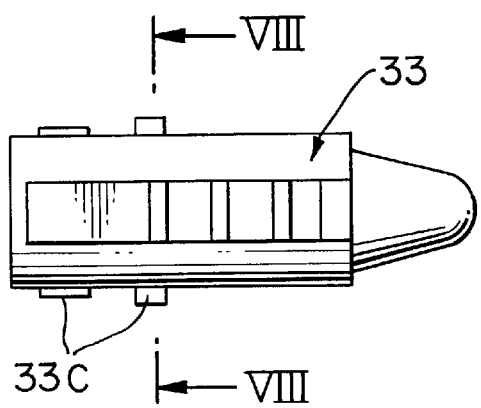
FIG. 7 is a plan view of a variant of the rear input member.
Figure 8:
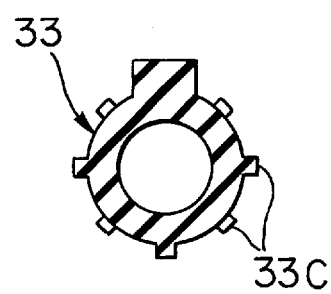
FIG. 8 is a cross section taken along a line VIII—VIII of FIG. 7.

The protrusions formed on the rear input member may comprise, as shown in FIGS. 5 and 6, a plurality of protrusions 23C extending longitudinally on the rear input member 23, or may comprise, as shown in FIGS. 7 and 8, a plurality of protrusions 33C circumferentially spaced apart from one another oh the peripheral surface of the soft input member 33, the protrusions 33C having different heights depending on their respective positions in the longitudinal directions.

Figure 9:
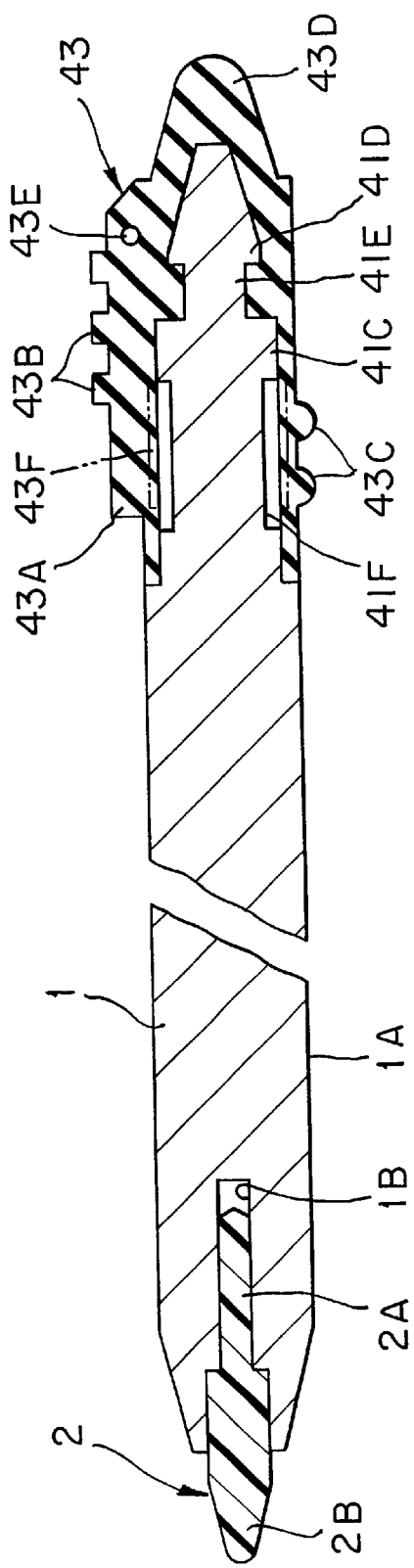
FIG. 9 is a longitudinal sectional view of a further embodiment of the input pen in accordance with the present invention.
Figure 10:
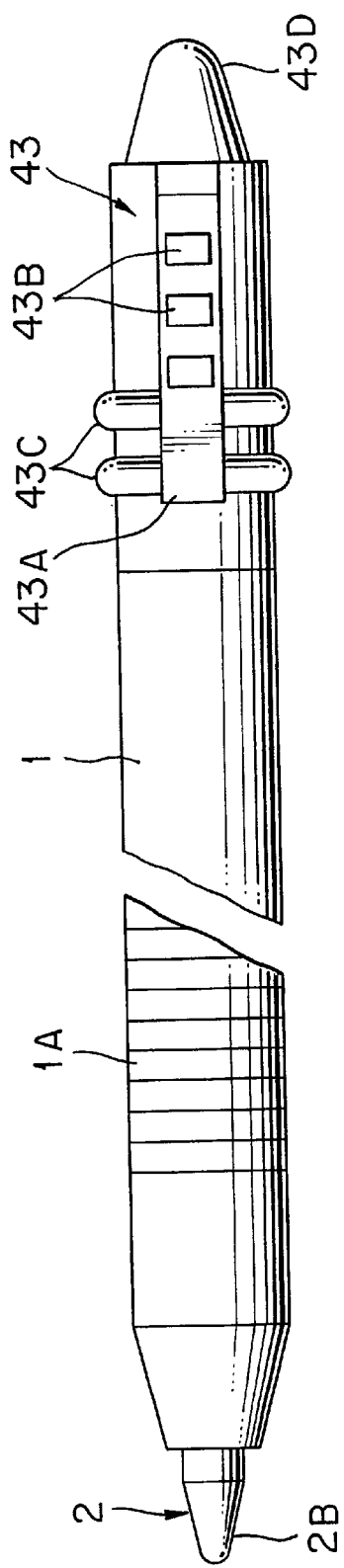
FIG. 10 is a plan view of FIG. 9.

FIGS. 9 and 10 illustrate a further embodiment of the input pen in accordance with the present invention.

The pen cylinder 1 has at its rear part a reduced diameter portion 41C behind which a flange 41D is shaped by way of a neck 41E having a further reduced diameter. The flange 41D is tapered to become thin rearward. A soft rear input member 43 is fixedly press-fitted onto the reduced diameter portion 41C and the flange 41D of the pen cylinder 1. It is to be appreciated that although not shown the rear input member 43 may be attached to the pen cylinder with an adhesive.

A longitudinally extending raised portion 43A is formed locally with respect to the circumferential direction on the rear input member 43 to prevent unintentional rolling of the input pen. The raised portion 43A is provided with slip resistant protrusions 43B. The rear input member 43 has a plurality of circumferentially extending protrusions 43C. An annular recess 41F is formed in the reduced diameter portion 41C of the pen cylinder 1 corresponding positionally to the inner surface of the protrusions 43C of the rear input member 43, to thereby form an appropriate annular space between the reduced diameter portion 41C of the pen cylinder 1 and the inner surface of the protrusions 43C of the rear input member 43. Thus, the annular protrusions 43C of the rear input member 43 attached to the pen cylinder 1 is elastically deformable radially inward.

Instead of the recesses 41F, annular recesses 43F may be provided on the inner surface of the rear input member 43 at positions corresponding to the protrusions 43C, as shown in FIG. 9.

When the input pen is accommodated within the input pen accommodating portion, the protrusions 43C of the rear input member 43 are elastically deformed radially inward and are brought into frictional contact with the inner surface of the input pen accommodating portion with an appropriate force, to thereby ensure a secure accommodation of the input pen. The rear input member 43 further comprises a substantially conical input portion 43D with a tip which is formed of a curved surface having a radius of curvature ranging from 1.0 mm to 4.0 mm inclusive. Preferably, the tip portion of the input portion 43D has a radius of curvature ranging from 1.0 mm to 2.0 mm inclusive. The rear input member 43 further comprises a hole 43E through which a string is passed. It will be noted that the construction of the front input member is the same as that of FIG. 1.

In this embodiment as well, when performing an input operation on a hard panel or an input operation of fine letters, use is made of the front input member 2 of synthetic resin provided on the front end of the pen cylinder, to effect an accurate input operation. When performing an input on the soft panel or pointing input, use is made of the input portion 43D formed on the rear input member 43, to thereby effecting an input operation without damaging the panel. In addition, two different types of input operations can be done by merely inverting the input pen, which is a very convenient feature for the user. Furthermore, when it is desired to dismount the input pen accommodated within the input unit body, fingers are used to act on the raised portion 43A of the rear input member 43 projecting out of the accommodating portion, thus accomplishing an easy dismounting of the input pen. The slip resistant protrusions 43B formed on the raised portion 43A will contribute to a secure action of the fingers without causing any slip.

Figure 11:
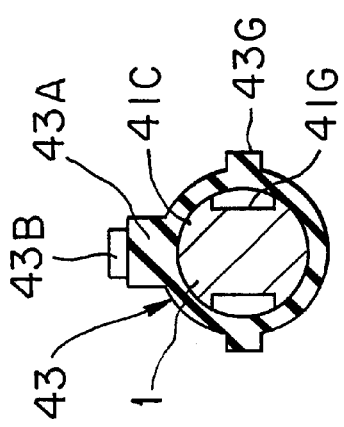
FIG. 11 is a cross section of a variant of the rear part of the input pen of FIG. 10.

FIG. 11 shows a variant of the rear part of the input pen shown in FIGS. 9 and 10. The rear input member 43 has a longitudinal raised portion 43A with outer protrusions 43B thereon. In this variant, the rear input member 43 has a pair of longitudinally extending protrusions 43G, while the pen cylinder 1 is formed with longitudinally extending recesses 41G at positions corresponding to the longitudinal protrusions 43G, respectively, so that the rear input member 43 can be elastically deformed radially inward in the areas of the protrusions 43G. The inner surface of the rear input member 43 may be formed with longitudinal recesses in the areas corresponding to the protrusions 43G.

The materials suitable for the above-described rear input member 43 are as follows. The vulcanized rubber can be natural rubber, isoprene rubber, styrene-butadiene rubber, butadiene rubber, nitrile rubber, chloroprene rubber, butyl rubber, acrylic rubber, silicone rubber, fluorinated rubber, ethylene-propylene rubber, epichlorohydrin rubber, polynorbornene rubber, urethane rubber, ethylene-vinyl acetate rubber, polyester rubber, chlorinated butyl rubber, polysulfide rubber, chlorosulfonated polyethylene, polyisobutylene, propylene oxide rubber, chlorinated polyethylene rubber, ethylene-acrylic rubber, tetrafluoroethylene-propylene rubber, hydrogenated nitrile rubber, etc. The thermoplastic elastomer can be olefin series, styrene series, vinyl chloride series, polybutadiene series, urethane series, polyester series, polyamide series, nitrile series, fluorine series, ionomer resin, soft nylon, special polymer alloy, chlorinated polyethylene, etc. From a total point of view including durability of the input portion and the prevention of damage to the panel, particularly preferred vulcanized rubbers are butadiene rubber, chloroprene rubber, ethylene-propylene rubber, urethane rubber, ethylene-vinyl acetate rubber and propylene-oxide rubber; and particularly preferred, thermoplastic elastomers are urethane series, polyamide series, ionomer resin and chlorinated polyethylene.

In order to ensure secure input operation free from slip on the panel, it is preferred that the rear input member has a rubber hardness of 50 or more in measurement by A-type hardness tester and of 80 or less in measurement by C-type hardness tester. Particularly preferred measurement values are 60 or more for the A-type hardness testing and 65 or less for the C-type hardness testing. The A-type and C-type hardness testers are defined in the hardness testing of JIS (JAPANESE INDUSTRIAL STANDARDS) K 6301 "vulcanized rubber physical testing method".

Figure 12:
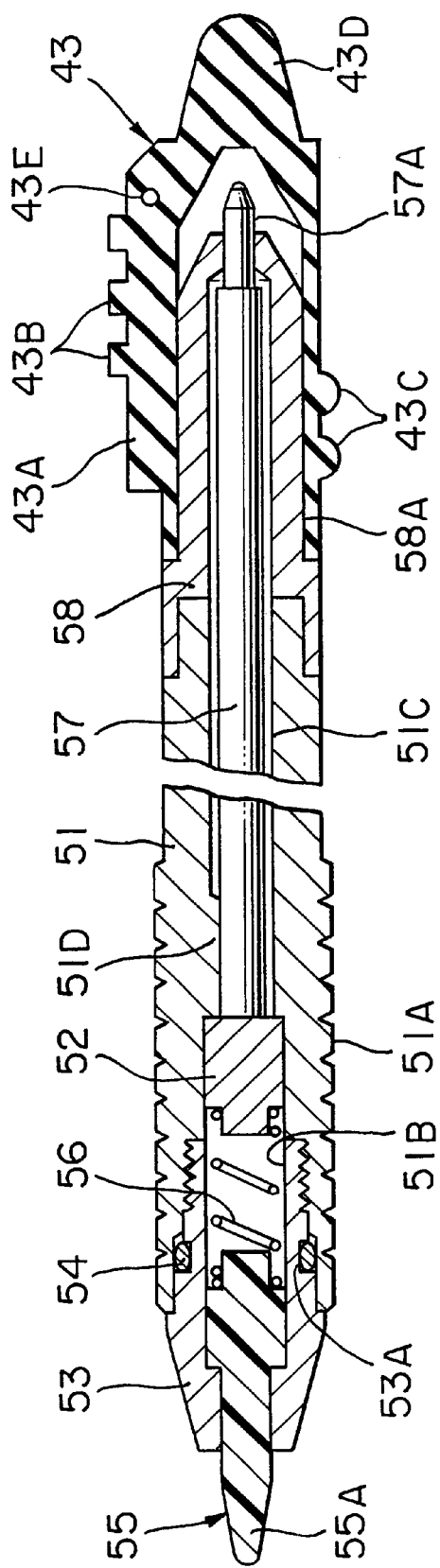
FIG. 12 is a longitudinal sectional view of still another embodiment of the input pen in accordance with the present invention.
Figure 15:
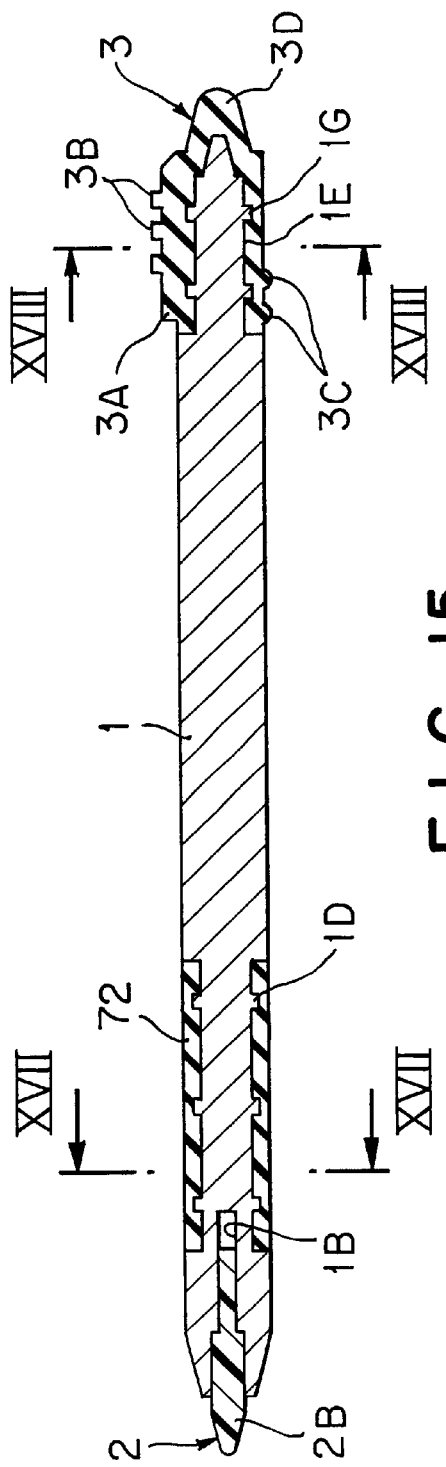
FIG. 15 is a longitudinal sectional view of a still further embodiment of the input pen in accordance with the present invention.
Figure 16:
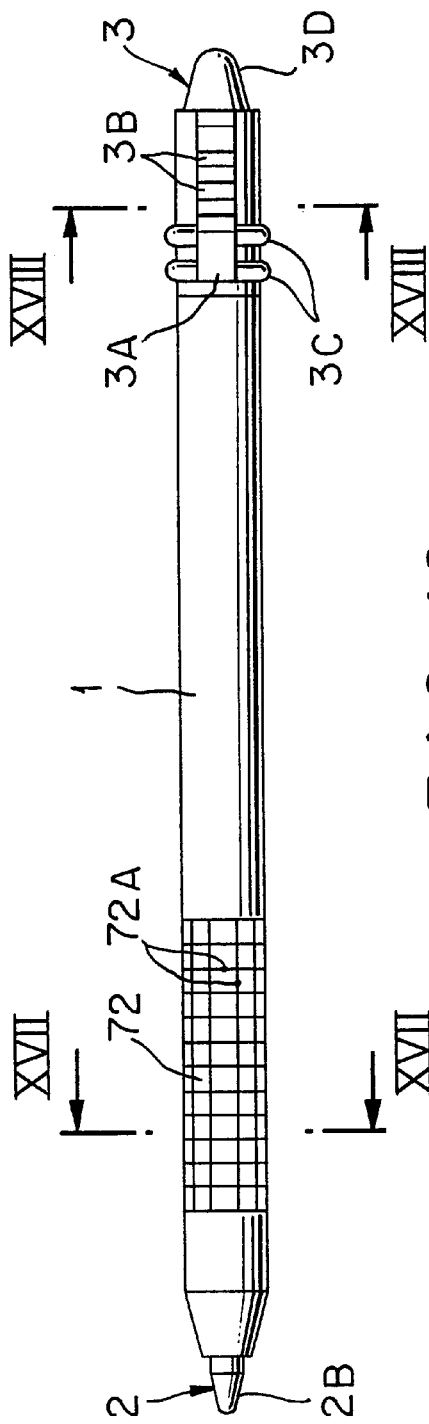
FIG. 16 is a plan view of FIG. 15.

FIGS. 12 and 13 illustrate still another embodiment of the input pen in accordance with the present invention.

A pen cylinder 51 is made of a synthetic resin or a metal and comprises a grip 51A provided with slip resistant grooves, a somewhat large diameter front hole 51B at the front part and a somewhat small diameter rear hole 51C at the rear part thereof. A fixed member 52 is press fitted into the front hole 51B of the pen cylinder 51. A forefront member 53 is screwed into the front part of the pen cylinder 51. The forefront member 53 is provided with a recessed groove 53A for receiving an O-ring 54 which comes into frictional contact with the inner surface of the pen cylinder 51 to prevent loosening of screwing of the forefront member 53 with the pen cylinder 51. A front input member 55 is slidably received in the forefront member 53 and a spring 56 is interposed between the front input member 55 and the fixed member 52. The spring 56 urges the front input member 55 forward so as to force an input portion 55A of the front input member 55 to project from the extremity of the forefront member 53.

In the same manner as the already described embodiments, the front input member 55 is made of synthetic resin such as polyacetal, polyethylene, nylon, etc. and the input portion 55A is substantially conical shaped with a tip which is formed from a curved surface having a radius of curvature ranging from 0.5 mm to 1.0 mm inclusive. Preferably, the tip of the front input member 55 is formed from a curved surface having a radius of curvature of the order of 0.8 mm.

The rear hole 51C of the pen cylinder 51 receives a ballpoint pen refill 57 so that the rear part of the refill 57 is fitted into a radial rib 51D provided in the rear hole 51C and that the tail end of the refill 57 abuts against the fixed member 52. A rear member 58 is screwed onto the rear part of the pen cylinder 51 and guides a writing portion 57A of the refill 57, which projects from the rear end of the rear member 58.

The rear member 58 comprises a reduced diameter portion 58A onto which is fitted a rear input member 43 made of a soft elastic material for protecting the writing portion 57A of the ballpoint pen refill 57. The construction of the rear input member 43 is substantially the same as that of the rear input member 43 shown in FIGS. 9 and 10, and hence its explanation will be omitted.

In the case of the input pen described above, the pen cylinder 51 has the ballpoint pen refill at its rear part, to thereby enable memoranda or check of input documents to be made simultaneously with the input operation. The ballpoint pen can be easily used by merely removing the rear input member 43 from the rear member 58.

FIG. 14 illustrates a variant of the front part of the input pen shown in FIG. 12. The front input member 55 is slidably received in the front hole 51B of the pen cylinder 51 and is urged forward by the spring 56 interposed between the front input member 55 and the fixed member 52. A stopper 60 is provided which is secured to the front hole 51B of the pen cylinder 51 and against which the front input member 55 comes into abutment.

FIGS. 15 to 19 illustrate a still further embodiment of the input pen in accordance with the present invention. Referring in particular to FIG. 19, the front part of the pen cylinder 1 is formed with a reduced diameter annular recess 70B. The recess 70B of the pen cylinder 1 includes a plurality of longitudinally extending protrusions 70C circumferentially spaced equally apart from one another in parallel relationship and a plurality of circumferentially extending protrusions 70D spaced apart from one another. The rear end portion of the pen cylinder 1 is formed with a reduced diameter portion 70E. The reduced diameter portion 70E includes a plurality of longitudinally extending protrusions 70F circumferentially spaced equally apart from one another in parallel relationship and a plurality of circumferentially extending protrusions 70G spaced apart from one another. The thus constructed pen cylinder 1 is formed with a cylindrical holder 72 (FIG. 15) provided in the recess 70B and a rear input member 3 provided on the reduced diameter portion 70E, both the cylindrical holder 72A and the rear input-member 3 being simultaneously insert-molded from the same soft elastic material on the pen cylinder 1. The surface of the cylindrical holder 72 is provided with a plurality of longitudinally and circumferentially extending grooves 72A for providing a slip resistant configuration. To facilitate the removal from the main body of the pressure sensitive handwriting input unit, the rear input member 3 is provided with a raised portion 3A and slip resistant protrusions 3B in the same manner as the FIG. 1 embodiment. The periphery of the rear input member 3 is provided with circumferentially extending protrusions 3C by means of which the input pen is fitted into the main body. The rear input member 3 further includes an input portion 3D of substantially a conical shape with a tip which is formed from a curved surface having a radius of curvature ranging from 1.5 mm to 4.0 mm inclusive. Particularly preferably, the tip of the rear input member 3 is formed from a curved surface having a radius of curvature of the order of 2.0 mm. The thus arranged cylindrical holder 72 and the rear input member 3 are rigidly fixed by the protrusions 70C, 70D, 70F and 70G of the pen cylinder 1, to thereby prevent the input pen from being displaced in the longitudinal direction and from turning in the circumferential direction.

The front input member 4 press-fitted into the hole 1B of the pen cylinder 1 has the same construction as that shown in FIG. 1 and hence the explanation thereof will be omitted.

In this embodiment as well, the front input member is used when performing an input operation onto a hard panel or an input operation of fine letters or the like whereas the rear input member is used when performing an input onto a soft panel or a pointing input, thus eliminating the necessity to provide two different types of pens, which will be very convenient feature for the user.

Although not shown, the recessed portion and the reduced diameter portion of the pen cylinder may be formed with longitudinally extending recessed grooves and circumferentially extending recessed grooves to thereby prevent the cylindrical holder and the rear input portion from being displaced in the longitudinal direction and from turning in the circumferential direction.

What is claimed is:

1. An input pen for use in a pressure sensitive handwriting input unit, comprising:

a pen cylinder having a front end and a read end;

a front input member disposed on said front end of said pen cylinder and having an input portion used for input operations, said front input member being made of a synthetic resin; and a rear input member disposed on said rear end of said pen cylinder and having an input portion used for input operations, said rear input member being made of an elastic material softer than said synthetic resin.

2. An input pen according to claim 1, wherein said input portion of the front input member has a tip for input, said tip being formed from a curved surface having a radius of curvature ranging from 0.5 mm to 1 mm inclusive.

3. An input pen according to claim 1, wherein said input portion of the rear input member has a tip for input, said tip being formed from a curved surface having a radius of curvature ranging from 1.5 mm to 4 mm inclusive.

4. An input pen according to claim 1, wherein said rear input member is made of a rubber.

5. An input pen according to claim 4, wherein said rubber is a fluorinated rubber.

6. An input pen according to claim 1, wherein said front input member is fitted into a hole at the front end of said pen cylinder.

7. An input pen according to claim 6, wherein a elastic member is interposed between said hole and said front input member.

8. An input pen according to claim 1, wherein said rear input member is in the form of a cap, said rear input member being fitted onto the exterior of the rear end of said pen cylinder.

9. An input pen according to claim 8, wherein said cap-like rear input member has a tip for input.

10. An input pen according to claim 8, wherein said rear input member has an exterior with a protrusion which, when inserted into an input pen accommodating portion of a pressure sensitive handwriting input unit main body, comes into frictional contact with said input pen accommodating portion.

11. An input pen according to claim 10, wherein said protrusion is a protrusion extending in the circumferential direction.

12. An input pen according to claim 8, wherein said rear input member has a longitudinal raised portion for preventing unintentional rolling of said input pen.

13. An input pen according to claim 10, wherein between the outer peripheral surface of said pen cylinder and said rear input member is provided a space at a position corresponding to said protrusion of the rear input member.

14. An input pen according to claim 1, wherein said rear input member is made of a rubber, said rubber having a hardness of 50 or more by A-type hardness tester (JIS) and of 80 or less by C-type hardness tester (JIS).

15. An input pen according to claim 4, wherein said rear input member is made of a diene series rubber.

16. An input pen according to claim 1, wherein said rear input member is made of a thermoplastic elastomer.

17. An input pen according to claim 1, wherein said pen cylinder has a first annular recess posterior to said front input member and a second annular recess at the position of said rear input member, said first annular recess being provided with a cylindrical holder, said cylindrical holder being made of the same soft elastic material as said rear input member, said cylindrical holder and said rear input member being simultaneously insert-molded in said first and second annular recesses, respectively.

18. An input pen according to claim 1, wherein said pen cylinder includes therein a writing element, said writing element having a writing end projecting from the rear end of said pen cylinder, said rear input member being fitted onto the exterior of said rear end of said pen cylinder so as to cover said writing end.

19. An input pen according to claim 1, wherein said pen cylinder has a fixed length.

20. An input pen according to claim 19, wherein the front input member is directly attached to said pen cylinder at the front end of said pen cylinder and wherein the rear input member is directly attached to said pen cylinder at the rear end of said pen cylinder.

21. An input pen according to claim 1, wherein the front input member has a tip for input, said tip having a first radius of curvature, and the rear input member has a tip for input, said tip of the rear input member having a second radius of curvature which is greater than said first radius.

* * * * *